(12) United States Patent
Lin (10) Patent No.: US 10,348,876 B2
(45) Date of Patent: Jul. 9, 2019

(54) FLEXIBLE SCREEN MOBILE TERMINAL

(71) Applicant: GUANGDONG OPPO MOBILE TELECOMMUNICATIONS CORP., LTD., Guangdong (CN)

(72) Inventor: Yugui Lin, Guangdong (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 0 days.

(21) Appl. No.: 15/645,546

(22) Filed: Jul. 10, 2017

(65) Prior Publication Data

US 2017/0310799 A1 Oct. 26, 2017

Related U.S. Application Data

(63) Continuation of application No. PCT/CN2016/081856, filed on May 12, 2016.

(30) Foreign Application Priority Data

Jul. 13, 2015 (CN) .......................... 2015 1 0408563

(51) Int. Cl.
  *G06F 1/16* (2006.01)
  *H04M 1/02* (2006.01)

(52) U.S. Cl.
  CPC ........ *H04M 1/0268* (2013.01); *G06F 1/1652* (2013.01); *H04M 1/0237* (2013.01); *H04M 1/0254* (2013.01); *G06F 1/1624* (2013.01); *H04M 1/0214* (2013.01); *H04M 2201/38* (2013.01)

(58) Field of Classification Search
  CPC ............. H04M 1/0268; H04M 1/0254; H04M 2201/38; G06F 1/1626; G06F 1/1641; G06F 1/1643; G06F 1/165; G06F 1/1652; G06F 3/0202; G06F 3/013; G06F 3/0346; G06F 3/1446; G06F 1/1677; G09G 3/001; G09G 5/00
  See application file for complete search history.

(56) References Cited

U.S. PATENT DOCUMENTS 6,667,888 B1 12/2003 Chang et al.
D736,767 S * 8/2015 Lee .............................. D14/344
(Continued)

FOREIGN PATENT DOCUMENTS

CN 101924804 A 12/2010
CN 102566816 A 7/2012
(Continued)

OTHER PUBLICATIONS

International Search Report (ISR) dated Jul. 27, 2016 for International Application No. PCT/CN2016/081856.
(Continued)

*Primary Examiner* — Jianxun Yang
(74) *Attorney, Agent, or Firm* — Ladas & Parry LLP (57) ABSTRACT

A flexible screen mobile terminal includes: a first body, a second body, a flexible screen, and a screen support, where the screen support is configured to fix the flexible screen, and enable the flexible screen to be movably connected to at least one of the first body and the second body. The terminal provided by the present disclosure may realize dual requirements for a large-size screen and a small-volume product.

18 Claims, 9 Drawing Sheets

(56) References Cited

U.S. PATENT DOCUMENTS

| | | |
|---|---|---|
| 2007/0129099 A1 | 6/2007 | Lee |
| 2010/0117975 A1* | 5/2010 | Cho ............... G06F 1/1626 345/173 |
| 2011/0095975 A1 | 4/2011 | Hwang et al. |
| 2012/0212433 A1 | 8/2012 | Lee et al. |
| 2014/0196253 A1 | 7/2014 | Song et al. |
| 2014/0196254 A1 | 7/2014 | Song |
| 2014/0285476 A1 | 9/2014 | Cho et al. |
| 2015/0119112 A1 | 4/2015 | Hwang et al. |
| 2015/0177789 A1 | 6/2015 | Jinbo |
| 2016/0070303 A1* | 3/2016 | Lee ............... G06F 1/1616 361/679.27 |
| 2016/0187930 A1 | 6/2016 | Jinbo |
| 2016/0381812 A1 | 12/2016 | Dong |

FOREIGN PATENT DOCUMENTS

| | | |
|---|---|---|
| CN | 203289507 U | 11/2013 |
| CN | 103926979 A | 7/2014 |
| CN | 103927940 A | 7/2014 |
| CN | 103941816 A | 7/2014 |
| CN | 104363316 A | 2/2015 |
| CN | 104537955 A | 4/2015 |
| CN | 104680940 A | 6/2015 |
| CN | 104980545 A | 10/2015 |
| CN | 204733213 U | 10/2015 |
| EP | 2 315 186 A2 | 4/2011 |
| EP | 2 690 521 A1 | 1/2014 |
| KR | 20140091275 A | 7/2014 |
| KR | 20140091276 A | 7/2014 |
| WO | 2014/148698 A1 | 9/2014 |
| WO | WO 2015143814 A1 | 10/2015 |

OTHER PUBLICATIONS

A Search Report for priority application CN 201510408563.9.
An Allowance Notification with a Supplementary Search Report dated Sep. 8, 2016 for CN Application No. 201510408563.9.
English abstract of CN 104980545 A.
English abstract of CN 204733213 U.
English abstract of CN 103927940 A.
English abstract of CN 104537955 A.
English abstract of CN 103941816 A.
English abstract of CN 203289507 U.
English abstract of CN 102566816 A.
Supplementary European Search Report (SESR) dated Jul. 11, 2018 for Application No. EP 16 82 3712.
English abstract for CN 104680940 A.
English abstract of CN 101924804 A.
English abstract of CN 104363316 A.

\* cited by examiner

FLEXIBLE SCREEN MOBILE TERMINAL

CROSS-REFERENCE TO RELATED APPLICATIONS

This application is a continuation of International Application No. PCT/CN2016/081856, filed on May 12, 2016, which claims priority to Chinese Patent Application No. 201510408563.9, filed on Jul. 13, 2015. The disclosures of the aforementioned applications are hereby incorporated by reference in their entireties.

TECHNICAL FIELD

The present disclosure belongs to a technical field of mobile terminals, and in particular, to a flexible screen mobile terminal.

BACKGROUND

With continuous innovation in mobile terminal function, a scope of application of a mobile terminal is expanding continuously, and requirement of a user for use of the mobile terminal is also comprehensively improved. As flexible screen technologies are gradually mature, terminal manufacturers are now gradually applying the technologies to their respective products to realize diversification of terminal form, especially to a terminal device that requires a changeable screen size.

DESCRIPTION OF EMBODIMENTS

Technical solutions of the present disclosure are further described as follows with reference to the accompanying drawings in specific implementation manners.

As shown in FIGS. 1 to 13, in an embodiment, a flexible screen mobile terminal in the present disclosure includes a first body, a second body, a flexible screen and a screen support.

The first body has a first surface for mounting the flexible screen.

The second body is disposed at one end of the first body, and has a second surface for mounting the flexible screen.

The flexible screen is lapped jointly on the first surface and the second surface.

The screen support is configured to fix the flexible screen, and enable the flexible screen to be movably connected to at least one of the first body and the second body.

The first body and the second body are detachably connected in a plug-connection mode, and the first body and the second body in a separation state are capable of rotating relatively around an axis parallel to a plane of the flexible screen. As shown in FIGS. 1 to 4 and 11 to 13, in the present disclosure, a mobile terminal is divided into a first body 100 and a second body 200. The first body 100 and the second body 200 are separable and are capable of rotating or folding relatively. The first body 100 and the second body 200 have a common flexible screen 300 to realize a selective operation on a large-size screen and a small-size screen of the terminal, so as to enhance user experience.

Specifically, there may be many types of connection relationships between the flexible screen 300 and the first body 100 or the second body 200.

For example, in an embodiment of the present disclosure, the flexible screen 300 is fixedly connected to a first surface 101 of the first body 100, and the flexible screen 300 and the second body 200 are relatively slidably connected at a second surface 201.

Since an axis 700 around which the first body 100 and the second body 200 rotate relatively may not be completely lapped with a plane of the flexible screen 300, in a process of relative rotation between the first body 100 and the second body 200, if the flexible screen is fixedly connected on both of them, it is inevitable to produce a force on the flexible screen 300, and the force may cause stretch or compression for the flexible screen 300 to a certain extent. When the flexible screen 300, the first body 100 and the second body 200 are in a fixed connection state, it may pull or extrude the flexible screen 300 that the force is not released, resulting in stretch deformation or compression deformation of the flexible screen 300, which affects a service life of the flexible screen 300. However, in this embodiment, when the first body 100 and the second body 200 are relatively rotating, the flexible screen 300 and the second body 200 are relatively sliding, thereby avoiding damage caused by the stretch or compression.

In an embodiment of the present disclosure, a connection relationship between the flexible screen and the terminal may further be: the first body 100 and the flexible screen 300 are relatively slidably connected at a first surface 101, and the second body 200 and the flexible screen 300 are fixedly connected at a second surface 201.

In an embodiment of the present disclosure, the flexible screen 300 and the first body 100 are relatively slidably connected at a first surface 101, and the flexible screen 300 and the second body 200 are relatively slidably connected at a second surface 201. This connection structure may enable the flexible screen 300 to slide relative to the first body 100 and the second body 200 in the process of relative rotation between the first body 100 and the second body 200, or selectively control a relative position of the fixed first body 100 and the flexible screen 300 or a relative position of the second body 200 and the flexible screen 300 by disposing a controllable clamping device.

In a specific embodiment of the present disclosure, a first body 100 and a second body 200 are slidably connected via a screen support 400.

Figure 5:
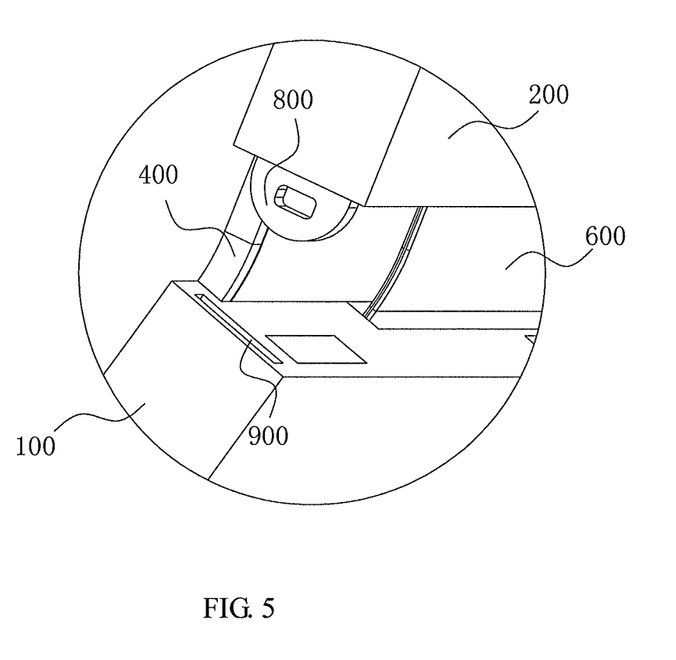
FIG. 5 is a magnified diagram of I position in FIG. 4.
Figure 13:
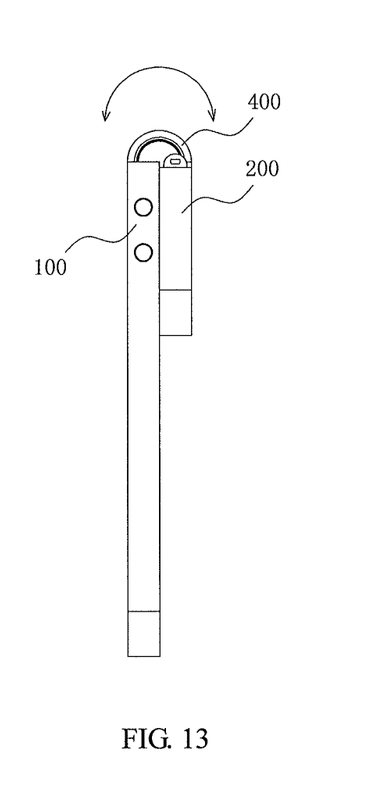
FIG. 13 is a side view of the third surface and the forth surface in the mutual bonding state in FIG. 11.

As shown in FIGS. 5 and 13, in an embodiment of the present disclosure, a screen support 400 is disposed at external of the flexible screen 300 for supporting the flexible screen 300, the flexible screen 300 is disposed on an inside of a frame of the screen support 400, and an outside of the frame of the screen support 400 is connected to the first body 100 and the second body 200.

Figure 8:
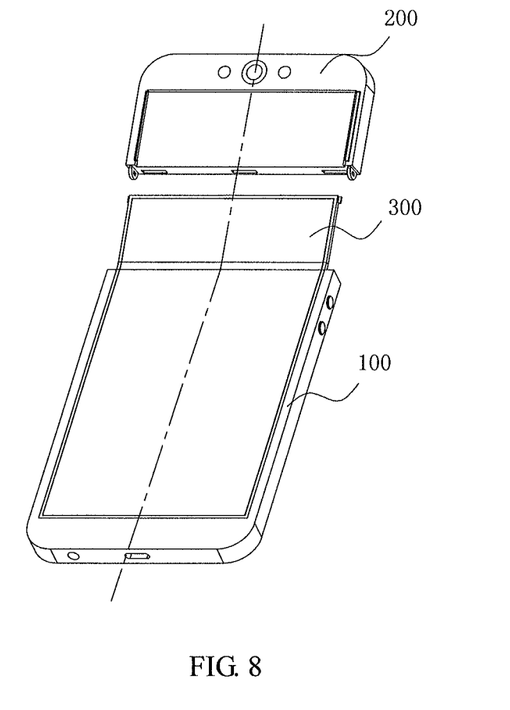
FIG. 8 is a schematic diagram of a first body and a second body in an exploded state in an embodiment of the present disclosure.
Figure 9:
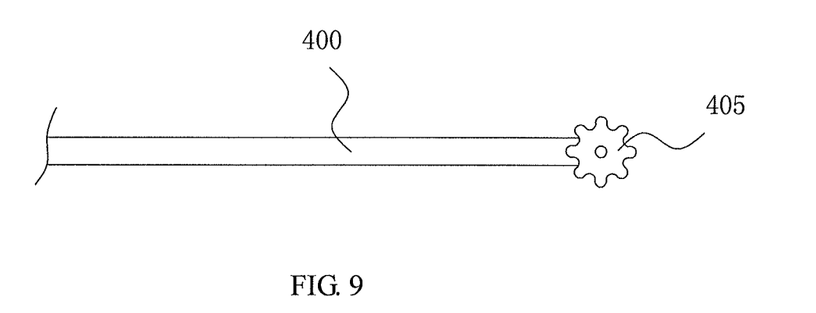
FIG. 9 is a side view of a screen support in an embodiment of the present disclosure.
Figure 10:
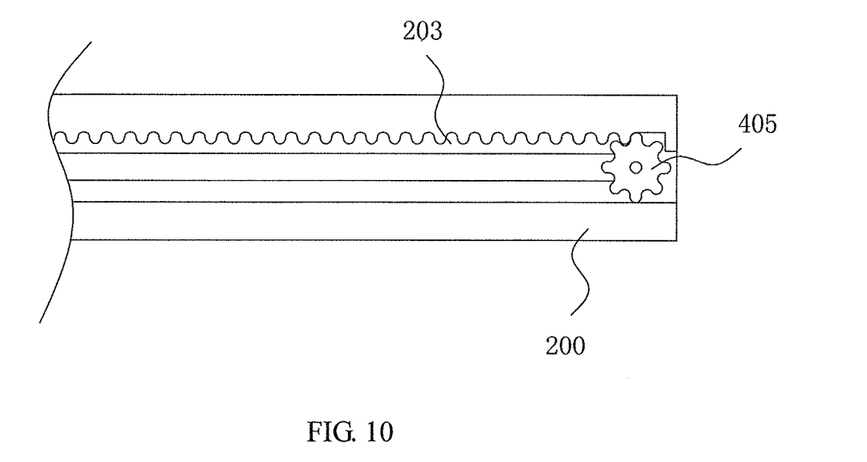
FIG. 10 is a schematic diagram of a screen support located in a chute in an embodiment of the present disclosure.
Figure 11:
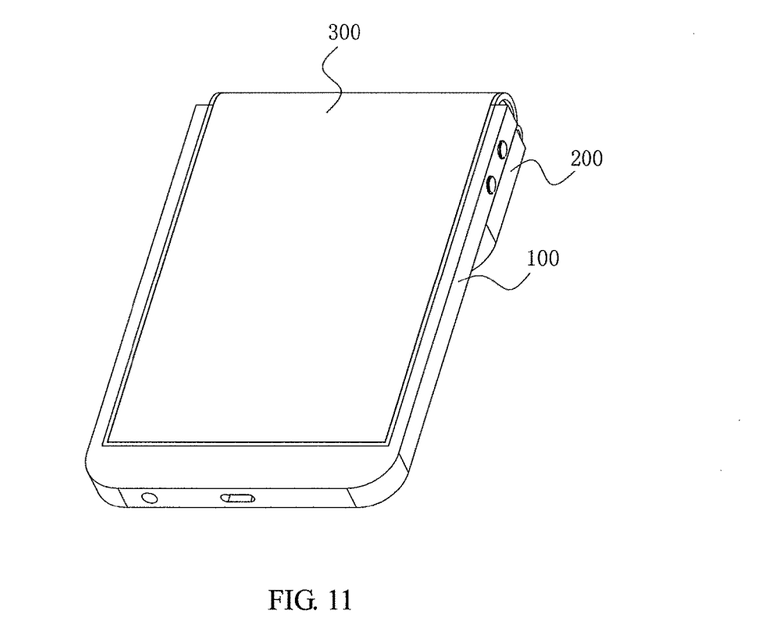
FIG. 11 is a schematic diagram of a third surface and a forth surface in a mutual bonding state in an embodiment.

As shown in FIGS. 8, 9 and 10, in an embodiment of the present disclosure, the second body 200 is provided with a chute 203 perpendicular to the axis 700, enabling the screen support 400 to slide in the chute 203, and the screen support 400 is slidably connected to the second body 200 via the chute 203. The screen support 400 is provided with a second body limit block 405 for limiting a relative sliding distance between the screen support 400 and the second body 200, and the second body limit block 405 is disposed at one end of the screen support 400 near the second body 200.

As shown in FIGS. 9 and 10, in an embodiment of the present disclosure, the second body limit block 405 is a gear-like structure, and is rotatably mounted to the screen support 400 via a rotation shaft. The chute 203 is provided with a rack structure matched with the second body limit block 405, and a relative position of the second body 200 and the screen support 400 is controlled by cooperation of a gear and a rack.

In an embodiment of the present disclosure, the first body 100 is provided with a chute perpendicular to the axis 700, enabling the screen support 400 to slide in the chute, and the screen support 400 is slidably connected to the first body 100 via the chute. The screen support 400 is provided with a first body limit block for limiting a relative sliding distance between the screen support 400 and the first body 100, and the first body limit block is disposed at one end of the screen support 400 near the first body 100.

Figure 6:
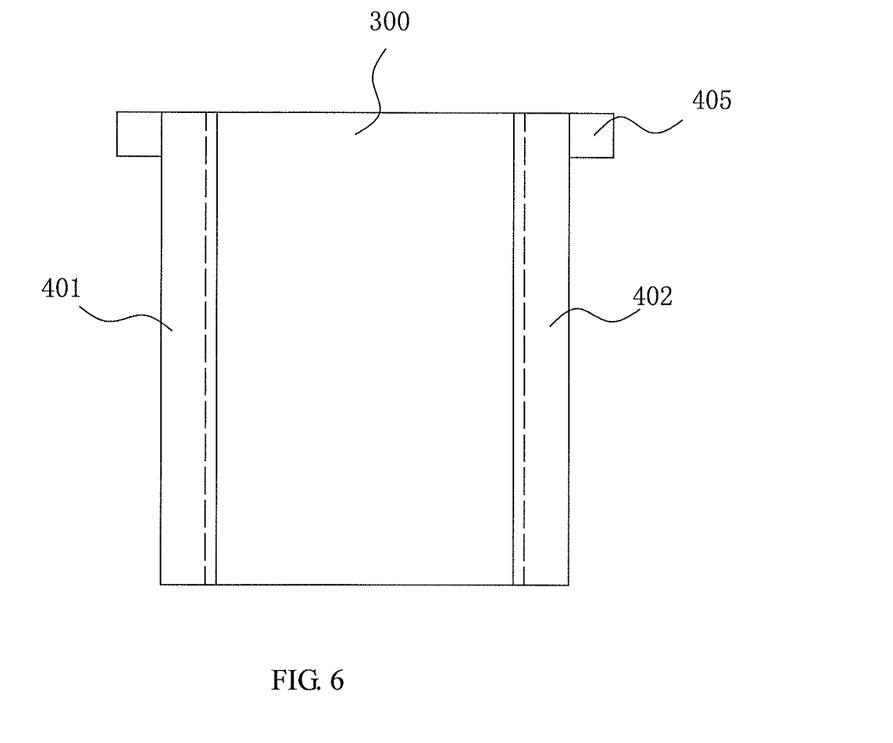
FIG. 6 is a schematic diagram of a screen support and a flexible screen in an assembly state in an embodiment of the present disclosure.

As shown in FIG. 6, the screen support 400 further includes: a first support piece 401 and a second support piece 402 disposed perpendicular to the axis 700 around which the first body 100 and the second body 200 rotate relatively, where the first support piece 401 and the second support piece 402 are disposed in parallel to each other, respectively located on both sides of the flexible screen 300, and fixedly connected to the flexible screen 300. When the screen support 400 and the second body 200 are slidably connected, and the first body 100 and the second body are relatively rotating, the screen support 400 is bended, and the screen support 400 is configured to slidably connect the flexible screen 300 and the second body 200. When the screen support 400 and the first body 100 are slidably connected, and the first body 100 and the second body 200 are relatively rotating, the screen support 400 is bended, and the screen support 400 is configured to slidably connect the flexible screen 300 and the first body 100.

In an embodiment of the present disclosure, the first support piece 401 and the second support piece 402 respectively include an upper support plate and a lower support plate parallel to each other, where the upper support plate and the lower support plate are made from a flexible material capable of being bent repeatedly, are respectively located on two surfaces of the flexible screen 300, and clamp the flexible screen 300 tightly.

In an embodiment of the present disclosure, the upper support plate and the lower support plate are a unitary structure, and a connection plate is disposed between the upper support plate the lower support plate. The upper support plate, the lower support plate and the connection plate form a groove for mounting the flexible screen 300, and the flexible screen 300 is fixedly mounted in the groove. The upper support plate, the lower support plate and the connection plate are made from a flexible material capable of being bent repeatedly.

Figure 7:
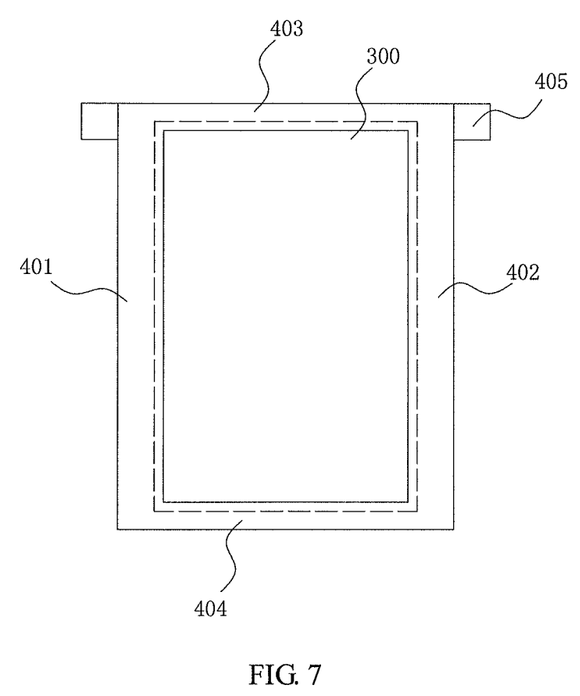
FIG. 7 is a schematic diagram of a screen support and a flexible screen in an assembly state in another embodiment of the present disclosure.

As shown in FIG. 7, in an embodiment of the present disclosure, a third support piece 403 and a fourth support piece 404 for connecting the first support piece 401 and the second support piece 402 are disposed at two ends of the first support piece 401 and the second support piece 402, respectively. In this embodiment, a structure, material and manufacturing method of the third support piece 403 and the fourth support piece 404 are same as those of the first support piece 401 and the second support piece 402.

In another embodiment, since it is unnecessary to bend the third support piece 403 and the fourth support piece 404 in a length direction thereof, the third support piece 403 and the fourth support piece 404 may be formed using a material with relatively rigidity, and support of the third support piece 403 and the fourth support piece 404 may ensure reliable support of the screen support 400 to the flexible screen 300.

In an embodiment of the present disclosure, the first body 100 further includes a third surface 102 opposite to the first surface 101, and a first body mounting space for mounting internal elements of the terminal is formed between the first surface 101 and the third surface 102; and the second body 200 further includes a forth surface 202 opposite to the second surface 201, and a second body mounting space for mounting the internal elements of the terminal is formed between the second surface 201 and the forth surface 202.

Conventional components in a traditional mobile phone, such as a first circuit board, a battery, a speaker, and an antennas, are disposed in the first body mounting space, and a second circuit board, a camera component 500, a flash light, and a receiver are disposed in the second body mounting space. Signal transmission between the first circuit board and the second circuit board is performed via a cable 600.

In an embodiment of the present disclosure, an independent power supply for supplying power to a second body portion may be disposed in the second body mounting space. When elements disposed in the second body mounting space are less, it may take full advantage of an internal space thereof to provide an independent power supply for supplying power to a flash light specially, and all elements disposed in the second body mounting space may also be supplied with the power via the independent power supply, so as to reduce consumption of battery power in the first body mounting space.

In an embodiment of the present disclosure, a power supply may be disposed only in the second body mounting space, and all elements in the first body mounting space and the second body mounting space are supplied with the power via the power supply disposed in the second body mounting space.

Figure 1:
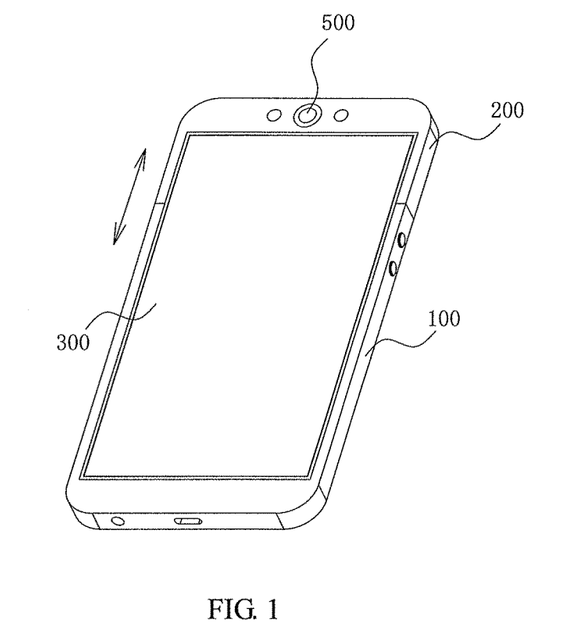
FIG. 1 is an isometric, schematic diagram of a flexible screen mobile terminal in an embodiment of the present disclosure.
Figure 2:
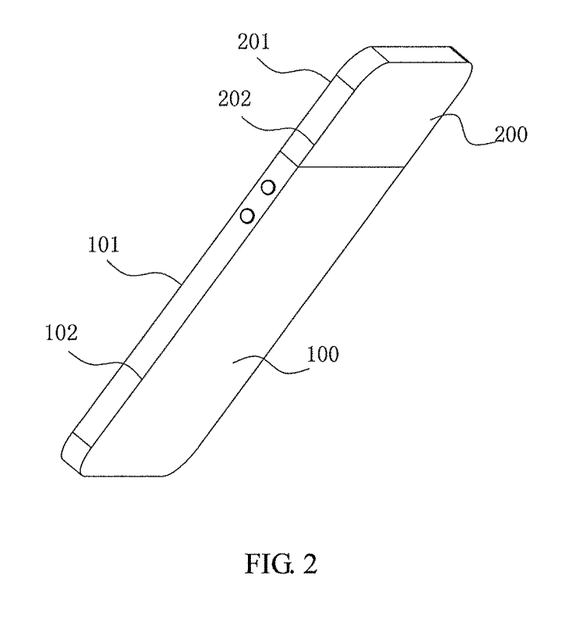
FIG. 2 is an isometric, schematic diagram of the flexible screen mobile terminal in FIG. 1, but viewed from another aspect.
Figure 3:
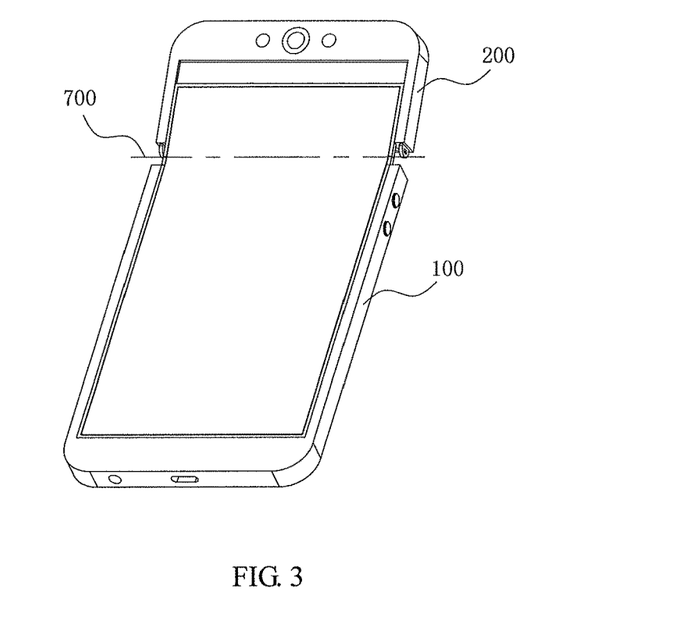
FIG. 3 is an isometric, schematic diagram of a first body and a second body in a separation state in an embodiment of the present disclosure.
Figure 4:
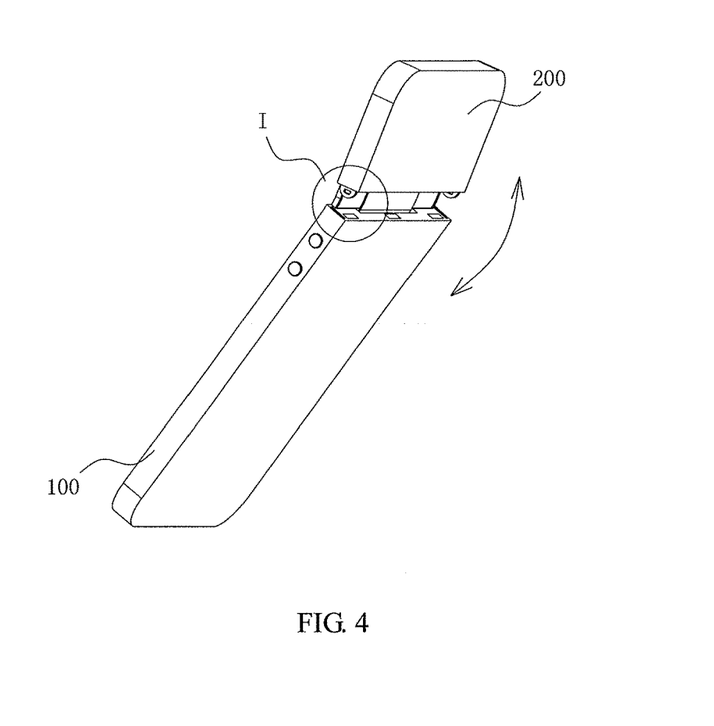
FIG. 4 is an isometric, schematic diagram of the first body and the second body in the separation state in FIG. 3, but viewed from another aspect.
Figure 12:
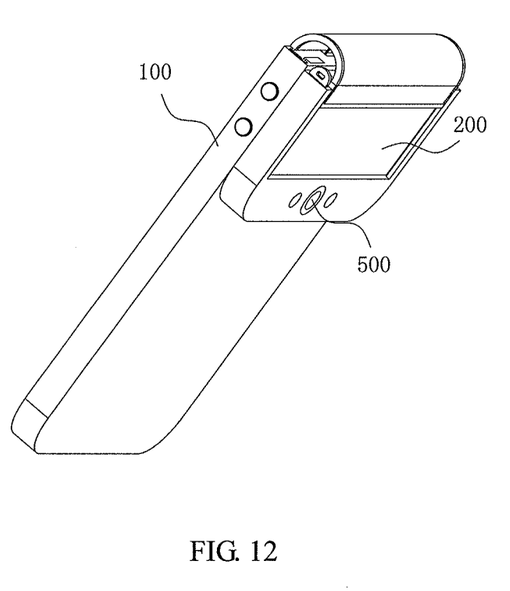
FIG. 12 is a schematic diagram of the third surface and the forth surface in the mutual bonding state in FIG. 11, but viewed from another aspect.

As shown in FIGS. 1, 3 and 12, in an embodiment of the present disclosure, a camera component 500 is disposed in the second body mounting space, and a lens of the camera component 500 is located on the second surface 201. The camera component 500 is disposed on the second surface 201, and the lens of the camera component 500 is located on the same side as a display of the flexible screen 300 when the first body 100 and the second body 200 are connected without relative rotation, which is convenient to preview a photographed image when taking a selfie. When the camera is rotated in a direction towards an operator, within a certain range of rotation angle, an image taken by the camera may be previewed in the flexible screen 300. When the camera is rotated in a direction away from the operator, the lens of the camera component 500 is gradually rotated to the back of the terminal, and a photographed image may be previewed in the flexible screen 300 while photographing a scene behind the terminal.

In an embodiment of the present disclosure, a relative rotation angle between the first body 100 and the second body 200 is 360 degree, that is, when taking a state that the first body 100 and the second body 200 are jointed to each other as a reference, the second body 200 is capable of rotating by 180 degree in a direction towards the first surface 101, so that the first surface 101 and the second surface 201 are bonded to each other; similarly, as shown in FIG. 13, when taking a state that the first body 100 and the second body 200 are jointed to each other as a reference, the second body 200 is capable of rotating by 180 degree in a direction towards the third surface 102, so that the third surface 102 and the forth surface 202 are bonded to each other.

As shown in FIG. 5, in an embodiment of the present disclosure, connection components are disposed at a position where the first body 100 and the second body 200 are connected, and the connection components are a buckle 800 and a slot 900 which are matched and can be connected or separated selectively; where the buckle 800 is disposed on the second body 200, and the slot 900 is disposed on the first body 100.

The first body 100 and the second body 200 are connected by the buckle 800 and the slot 900; when it is unnecessary to rotate the first body 100 and the second body 200 relatively, both of them are fixedly connected via the buckle 800 and the slot 900, so that the first body 100 and the second body 200 are connected tightly to form a structure similar to a conventional integration terminal.

When it is necessary to rotate the first body 100 and the second body 200 relatively, the buckle 800 is separated from the slot 900, constraint on the first body 100 and the second body 200 from the buckle 800 and the slot 900 is released, and relative rotation between the first body 100 and the second body 200 may be performed.

Specifically, both the first body 100 and the second body 200 have a terminal connection surface, where when the first body 100 and the second body 200 are connected, terminal connection surfaces of the first body 100 and the second body 200 are opposite, the buckle 800 is a convex structure disposed protruding from the terminal connection surface, and the buckle 800 is provided with a limit hole penetrating the buckle 800; the slot 900 is a groove structure disposed corresponding to the buckle 800 and pitting in the terminal connection surface, and an elastic limit piece matched with the limit hole is disposed in the slot; a limit piece operation component for operating the elastic limit piece is disposed on a side wall of the slot 900; and the limit piece operation component controls the elastic limit piece to insert into or separate from the limit hole selectively, so as to realize clamping connection or separation.

It should be pointed out that arrangement forms of the buckle 800 and the slot 900 are not limited to the foregoing manner, and the buckle 800 may also be disposed on the first body 100, and the slot 900 is disposed on the second body 200 in another embodiment.

As shown in FIGS. 3 to 5, and FIGS. 11 to 13, in an embodiment of the present disclosure, the first body 100 and the second body 200 are connected in a plug-connection mode, the first body 100 and the second body 200 may relatively move in a direction perpendicular to a connection surface to be separated; when the two are separated, the first body 100 and the second body 200 are connected via a deformable screen support 400, and thus a relative angle between the two may be changeable to realize relative rotation.

In an embodiment of the present disclosure, a driving device is disposed on the first body 100, and the driving device enables the first body 100 and the second body to rotate relatively. Rotation of the second body 200 relative to the first body 100 is driven by the driving device, so as to automate the operation, and an angle of movement of the second body 200 relative to the first body 100 is controllable, which acts as definition to a relative position between the first body 100 and the second body 200, so that the first body 100 and the second body 200 are relatively fixed at a position with any angle within a range of angle in which the two are capable of relatively rotating, and the angle may not change by itself to affect photographing effect in photographing with a camera.

In another embodiment of the present disclosure, the driving device for driving the rotation of the second body 200 relative to the first body 100 may also be disposed on the second body 200.

In an embodiment of the present disclosure, the mobile terminal is a mobile phone.

In another embodiment of the present disclosure, the mobile terminal may also be other types of mobile terminal devices.

In the description herein, terms "first", "second", "third" and "fourth" are merely for distinguishing objects in description, without representing any special meaning.

It should be stated that the foregoing specific implementation manners are only optimal embodiments and applied technical principles of the present disclosure.

Any change or substitution that is readily conceived for any skilled one who is familiar with this art within the technical scope disclosed by the present disclosure shall fall into the protection scope of the disclosure.

What is claimed is:

1. A flexible screen mobile terminal, comprising:
  a first body, having a first surface for mounting a flexible screen;
  a second body, disposed at one end of the first body, and having a second surface for mounting the flexible screen;
  the flexible screen, lapped jointly on the first surface and the second surface; and
  a screen support, configured to fix the flexible screen, and enable the flexible screen to be movably connected to at least one of the first body and the second body;
  wherein connection components are disposed at a position where the first body and the second body are connected, and the connection components are a buckle and a slot which are matched and can be connected or separated selectively.

2. The flexible screen mobile terminal of claim 1, further comprising:

a driving device, disposed on one of the first body and the second body, for driving relative rotation between the first body and the second body.

3. The flexible screen mobile terminal of claim 1, wherein the first body and the second body are detachably connected in a plug-connection mode.

4. The flexible screen mobile terminal of claim 1, wherein the first body and the second body in a separation state are capable of rotating relatively around an axis parallel to a plane of the flexible screen.

5. The flexible screen mobile terminal of claim 1, wherein the second body is provided with a camera component, and a lens of the camera component is located on the second surface.

6. The flexible screen mobile terminal of claim 1, wherein the first body is provided with a chute, enabling the screen support to slide in the chute, and the screen support is slidably connected to the first body via the chute.

7. The flexible screen mobile terminal of claim 6, wherein the screen support is provided with a first body limit block for limiting a relative sliding distance between the screen support and the first body, and the first body limit block is disposed at one end of the screen support near the first body.

8. The flexible screen mobile terminal of claim 1, wherein the second body is provided with a chute, enabling the screen support to slide in the chute, and the screen support is slidably connected to the second body via the chute.

9. The flexible screen mobile terminal of claim 8, wherein the screen support is provided with a second body limit block for limiting a relative sliding distance between the screen support and the second body, and the second body limit block is disposed at one end of the screen support near the second body.

10. The flexible screen mobile terminal of claim 1, wherein both the first body and the second body have a terminal connection surface, wherein when the first body and the second body are connected, terminal connection surfaces of the first body and the second body are opposite, the buckle is a convex structure disposed protruding from one terminal connection surface, and the buckle is provided with a limit hole penetrating the buckle.

11. The flexible screen mobile terminal of claim 10, wherein the slot is a groove structure disposed corresponding to the buckle and pitting in another terminal connection surface, and an elastic limit piece matched with the limit hole is disposed in the slot.

12. The flexible screen mobile terminal of claim 11, wherein a limit piece operation component for operating the elastic limit piece is disposed on a side wall of the slot.

13. A flexible screen mobile terminal, comprising:
a first body, a second body, a flexible screen and a screen support;
wherein the screen support is configured to fix the flexible screen and the flexible screen is movably connected to at least one of the first body and the second body via the screen support;
wherein connection components are disposed at a position where the first body and the second body are connected, and the connection components are a buckle and a slot which are matched and can be connected or separated selectively.

14. The flexible screen mobile terminal of claim 13, wherein the first body and the second body are detachably connected in a plug-connection mode, and the first body and the second body in a separation state are capable of rotating relatively around an axis parallel to a plane of the flexible screen.

15. The flexible screen mobile terminal of claim 13, wherein the first body is provided with a chute, enabling the screen support to slide in the chute, and the screen support is slidably connected to the first body via the chute.

16. The flexible screen mobile terminal of claim 15, wherein the screen support is provided with a first body limit block for limiting a relative sliding distance between the screen support and the first body, and the first body limit block is disposed at one end of the screen support near the first body.

17. The flexible screen mobile terminal of claim 13, wherein the second body is provided with a chute, enabling the screen support to slide in the chute, and the screen support is slidably connected to the second body via the chute.

18. The flexible screen mobile terminal of claim 17, wherein the screen support is provided with a second body limit block for limiting a relative sliding distance between the screen support and the second body, and the second body limit block is disposed at one end of the screen support near the second body.

* * * * *